Dec. 15, 1931.  E. G. C. LOFGREN ET AL  1,836,538
ELECTRIC TOASTER
Filed Feb. 11, 1929  5 Sheets-Sheet 1

Inventors
Einar G. C. Lofgren
William M. Anderson
By their Attorneys

Dec. 15, 1931.  E. G. C. LOFGREN ET AL  1,836,538
ELECTRIC TOASTER
Filed Feb. 11, 1929    5 Sheets-Sheet 2
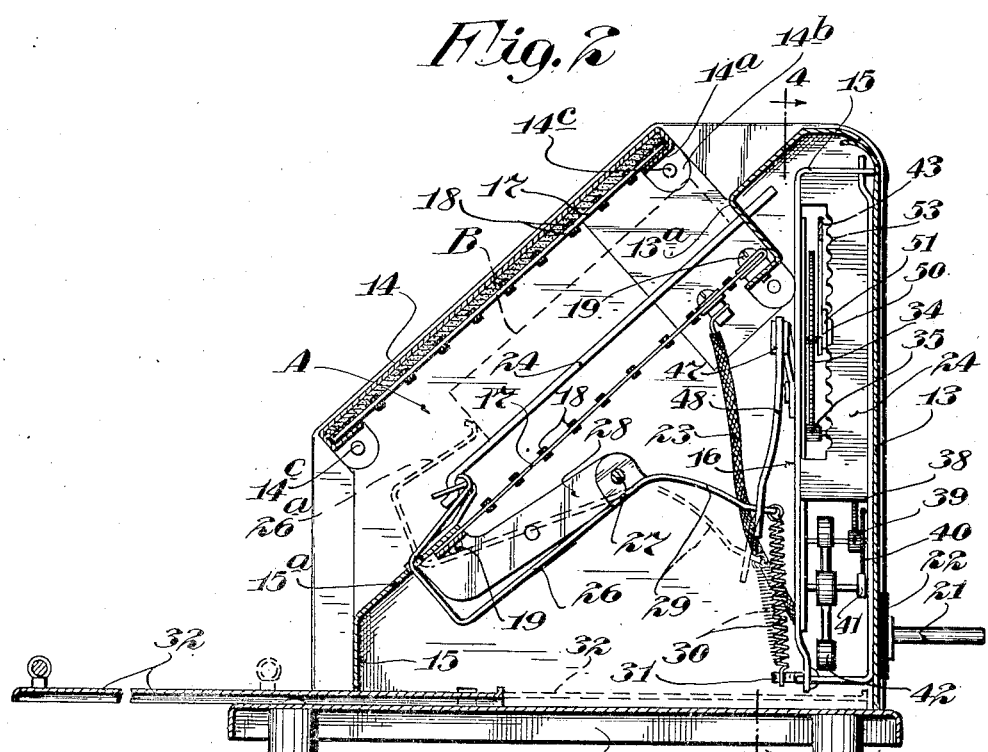
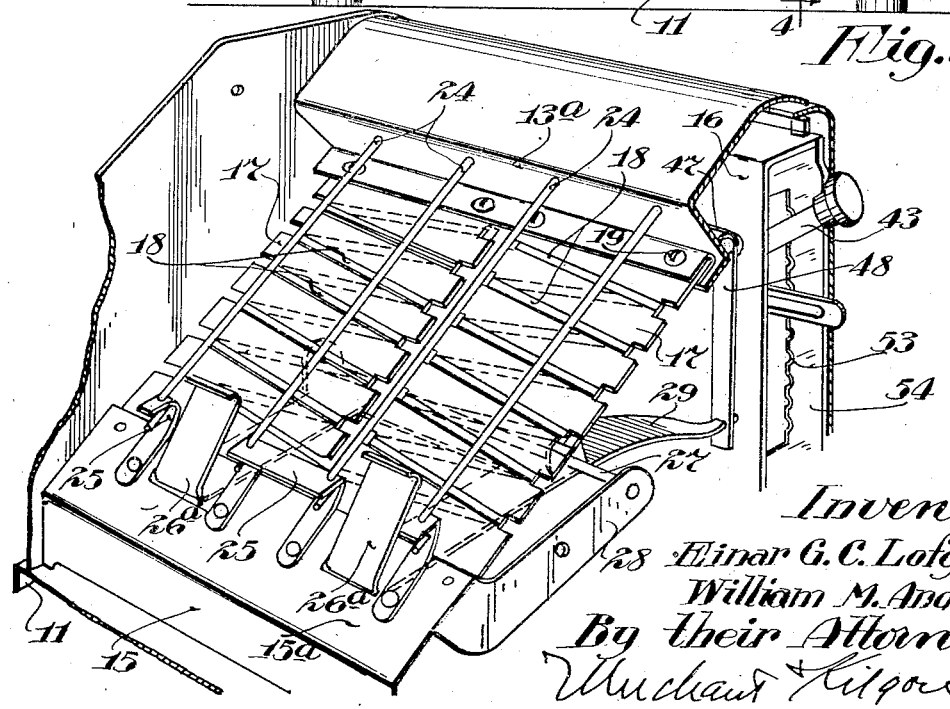

Dec. 15, 1931.　　　E. G. C. LOFGREN ET AL　　　1,836,538
ELECTRIC TOASTER
Filed Feb. 11, 1929　　5 Sheets-Sheet 3

Inventors
Einar G. C. Lofgren
William M. Anderson
By their Attorneys
Michael Kilgore Dec. 15, 1931.  E. G. C. LOFGREN ET AL  1,836,538
ELECTRIC TOASTER
Filed Feb. 11, 1929   5 Sheets-Sheet 4

Inventors
Einar G. C. Lofgren
William M. Anderson
By Their Attorneys
Merchant & Kilgore

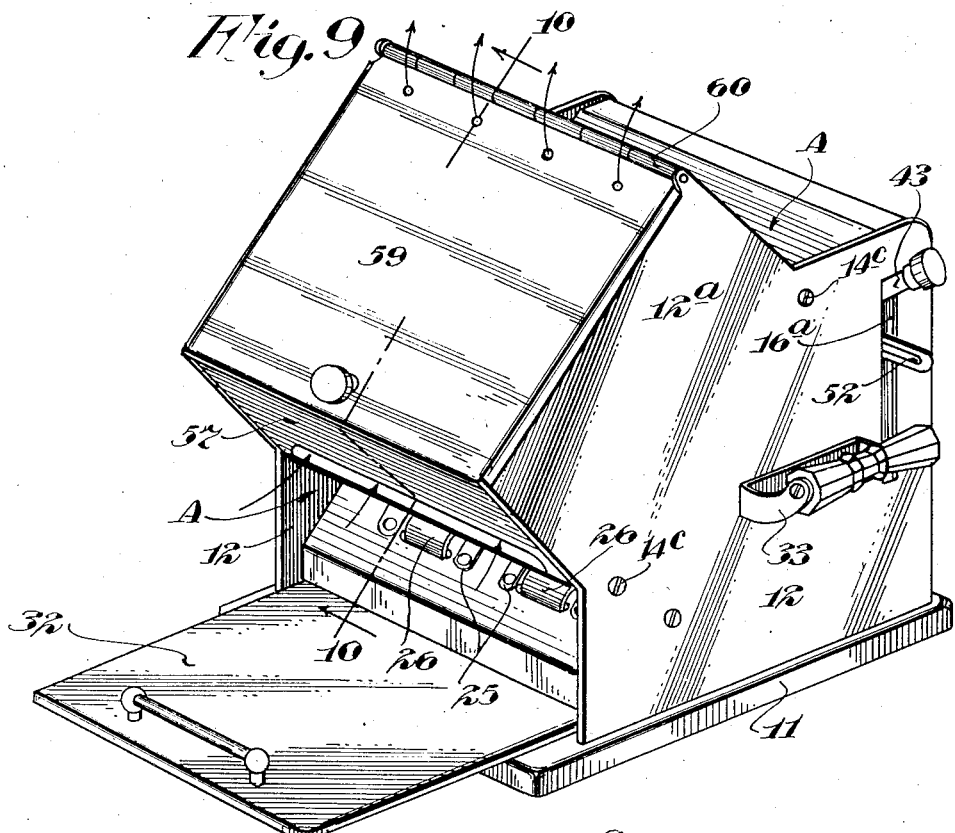

Patented Dec. 15, 1931

1,836,538

UNITED STATES PATENT OFFICE

EINAR G. C. LOFGREN AND WILLIAM M. ANDERSON, OF MINNEAPOLIS, MINNESOTA

ELECTRIC TOASTER

Application filed February 11, 1929. Serial No. 339,113.

This invention relates to electric toasters and particularly to the type generally designated as automatic toasters in that there is a timed operation at the completion of the toasting action; and, generally stated, the invention consists of the novel devices, combinations of devices and arrangement of parts hereinafter described and defined in the claims. Certain of the features of the invention are highly desirable in electric toasters generally whether or not there is a timed operation. In the hereinafter described preferred forms of the invention, the timed action causes or permits a movement of the toast from the toasting zone upon the completion of the toasting action, but the supply of current to the electrical heating elements is not automatically cut off at the completion of each toasting operation, for practice has demonstrated that it is better to keep the electrical heating elements hot during the period or time that the toaster is being used for one meal, for example.

In accordance with the general plan of the present invention, the electrical heating elements are arranged and so spaced within a suitable casing as to afford an inclined toasting chamber that is open at the upper and lower ends and through which the toast will slide freely when released. In connection with the spaced electrical inclined heating elements there is provided a toast-intercepting detent that will normally hold the bread slice in position for toasting; but which detent, when retracted, will release the toast and permit the same to slide under the action of gravity out of the lower end of the inclined toasting chamber. In the timed toaster, timed tripping mechanism for retracting the detent and releasing the toast is provided.

The invention also involves various other important features as will appear in the description of the several somewhat modified forms of the invention illustrated in the accompanying drawings.

In the drawings, wherein like characters indicate like parts throughout the several views,—

Fig. 2 is a vertical section taken through the toaster from the front to rear approximately in the vertical plane indicated by the irregular line marked 2—2 on Fig. 1;

Fig. 3 is a perspective showing the parts sectioned as in Fig. 2, some parts being broken away and some parts being removed;

Fig. 9 is another perspective view corresponding to Fig. 1, but illustrating a modified form in which the casing is provided with a warming oven to contain the toasted bread; and Fig. 10 is a fragmentary section taken in the plane approximately indicated by the line marked 10—10 on Fig. 9.

Figure 1:
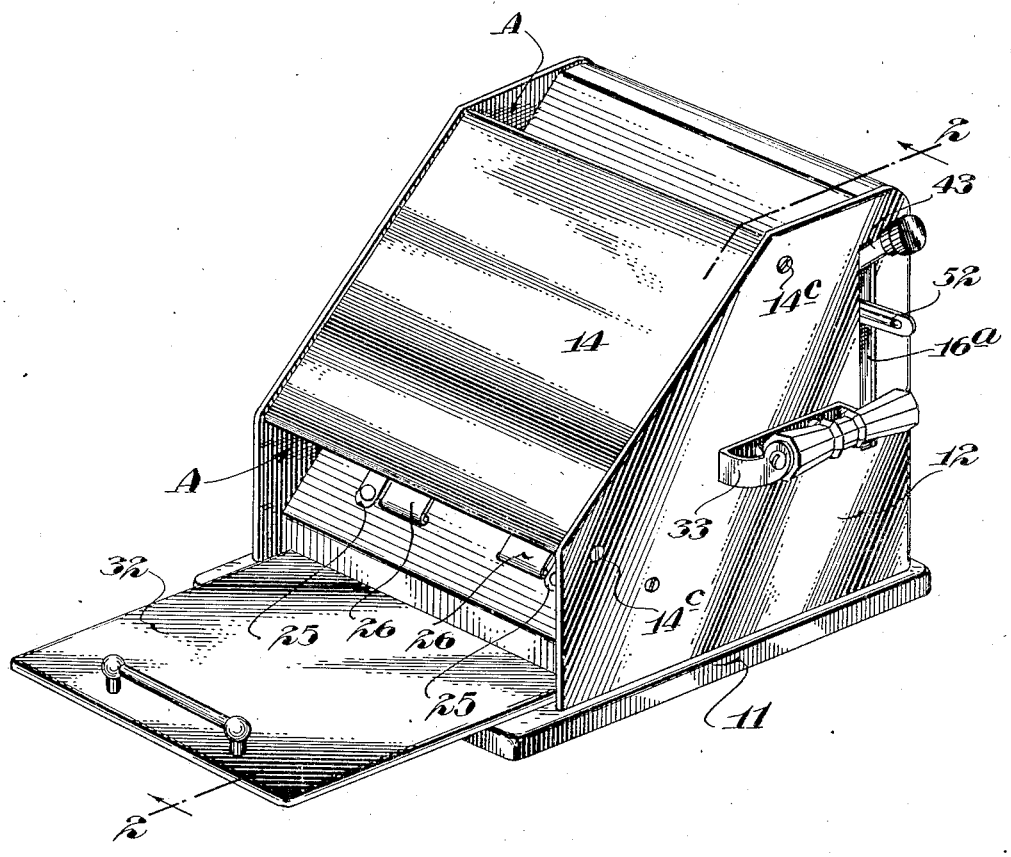
Fig. 1 is a perspective showing the simplest form of the toaster illustrated.
Figure 4:
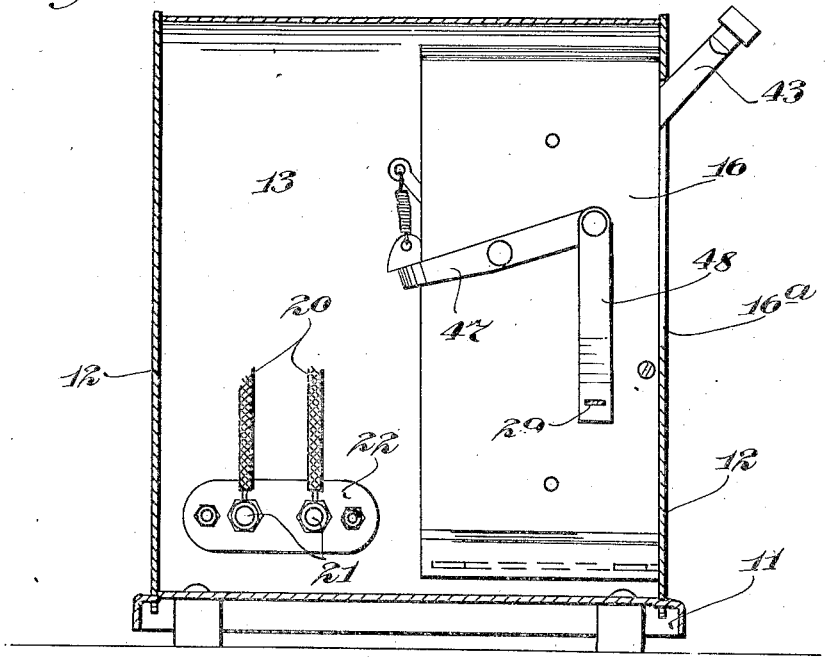
Fig. 4 is a transverse section taken through the toaster approximately on the line marked 4—4 on Fig. 2.

Describing first the simplest form of the device illustrated in Figs. 1 to 6, inclusive, the numeral 11 indicates the base, the numeral 12, the side plates, the numeral 13, the back plate, the numeral 14, the inclined top plate, and the numeral 15 the short front plate of the toaster casing which is preferably a stamped sheet metal structure. The back plate 13 at its upper end is bent forwardly and then obliquely downward to form a depending Z-shaped flange 13ª that is spaced from the body of the back plate 13 to afford space for the rectangular supporting frame 16 in which, as will presently appear, a timing mechanism is mounted. The short front plate 15 is turned obliquely upward to

moving gear 34. The lever 43 is subject to the tension of a coiled spring 46 attached to the inner end thereof and anchored to the bottom of the frame 16. The actuating lever 43 works through a slot 16ᵃ in the side of the casing 13 and projects from the casing so that its outer end is in position to be engaged and depressed at will by the hand of the operator. Spring 46 normally holds lever 43 in the position shown in Figs. 1, 2, 3, 4 and 5. The inner end of lever 43 engages the upper edge of the inner end of a lever 47 that is pivoted to the frame 16 and the other end of which is connected to the upper end of a link 48, the lower end of which is connected to the arm 29 of the detent 26, said connection, as shown, being made by extending said arm 29 through a slot in the lower end of said link.

Figure 5:
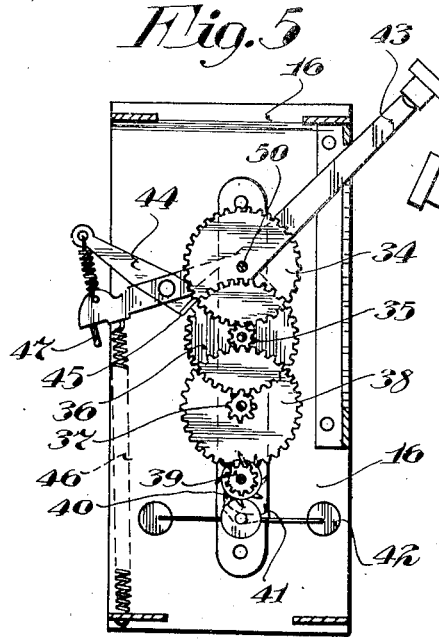
Fig. 5 is a detail of the timing mechanism and its supporting frame removed from the toaster and sectioned approximately on the line 5—5 of Fig. 2.
Figure 6:
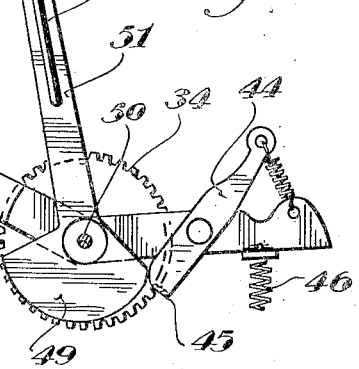
Fig. 6 is a detail in front elevation showing levers and trip device of the timing mechanism removed from their supporting frame.

By reference to Figs. 5 and 6 it will be noted that the gear-engaging end 45 of dog 44 is a laterally bent or projected portion of said dog and that that end of said dog to which said lug 45 is applied is normally in the path of movement of a dog-tripping segment 49 that is pivoted on a pin 50, which pin also affords the pivot for lever 43 and journal for gear 34. Segment 49 has an arm 51 that extends outward to the exterior of the casing through slots or clearance passages provided therefor and for the actuating lever 43. As a means for holding arm 51 and segment 49 in any one of the several set adjustments, said arm as shown is provided with a projected longitudinally extended rib 52 that is arranged to be spring-pressed into engagement with notches 53 formed in a flange 54 of frame 16. By lateral pressure on arm 51 it may be released from the notches 53 and moved to any desired adjustment and then set in such adjustment against accidental movements.

*Operation of the device so far described*

Normally, the detent-forming dog 26 will be in the intercepting position shown by dotted lines in Fig. 2, actuating lever 43 will be in its uppermost position, and dog-releasing segment 49 will be in one or the other of its set positions and at such time, the timing mechanism will, of course, be at rest. To set the timing mechanism into action, actuating lever 43 will be depressed to its limit or as far as permitted by the slot 16ᵃ and will then be released. When lever 43 depressed the dog 44 by virtue of the bevel of its lug 45 will cam itself back over the teeth of the gear 34 and engage the tooth aligned therewith at the limit of the depression of the projecting end of said lever 43. When the depressed lever 43 is released, spring 46 acting through lever 43 and dog 44 will rotate gear 34 in a counter-clockwise direction in respect to Fig. 5 or in a clockwise direction in respect to Fig. 6 and will drive escapement wheel 40 at a relatively high speed, which speed used will be retarded by the weighted escapement dog 41.

The train of gears and the escapement will be driven under the force supplied by spring 46 until the end of dog 44 is engaged with the tripping segment 49 and by the latter cammed out of engagement with the teeth of gear 34, and thereupon, lever 43 being released from the gears, will, by the spring 46 be caused to instantly complete its return or upward movement to normal position. In making this return movement to normal position the inner end of lever 43 will engage intermediate lever 47 and through link 18 will instantly retract the detent dogs 26, returning the same to position shown by full lines in Fig. 2 and permitting the toast to slide under the action of gravity out of the toasting chamber A and onto the projected shelf 32.

Obviously, the toasting period or time that the bread slice is confined in the toasting chamber will depend on the setting of the tripping cam 49. The farther said tripping segment is set away from the normal position of the dog 44 in the counter-clockwise direction in respect to Fig. 5, or in a clockwise direction in respect to Fig. 6, the greater will be the time interval or toasting period and conversely. Under the above described operation, it will be assumed that the current remains on, thereby keeping the electrical heating elements at proper temperature for toasting during the idle periods or times between placing of bread slices within the toasting chamber so that the toasting will begin immediately upon the introduction of the bread slice into the toasting chamber and this is found to be an advantage over automatically cutting off the current, for the latter action requires an interval of time for the electrical elements to become heated to proper toasting temperatures.

Figure 7:
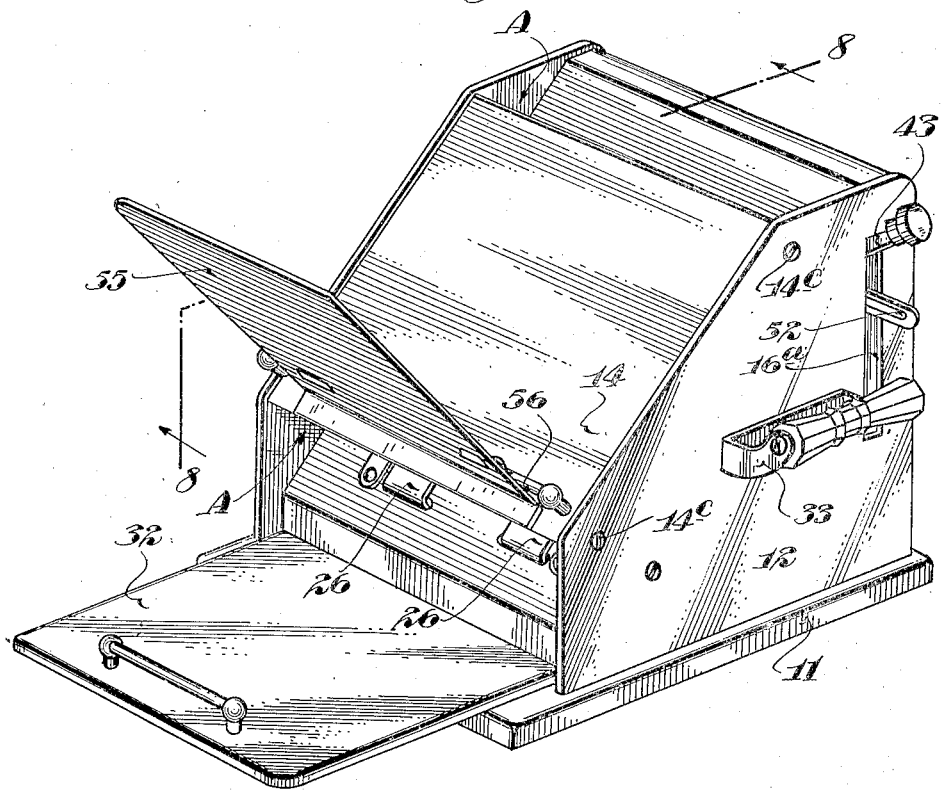
Fig. 7 is a perspective corresponding to Fig. 1, but illustrating a slightly modified form wherein the casing is provided with a toast support in the form of a hinged leaf.
Figure 8:
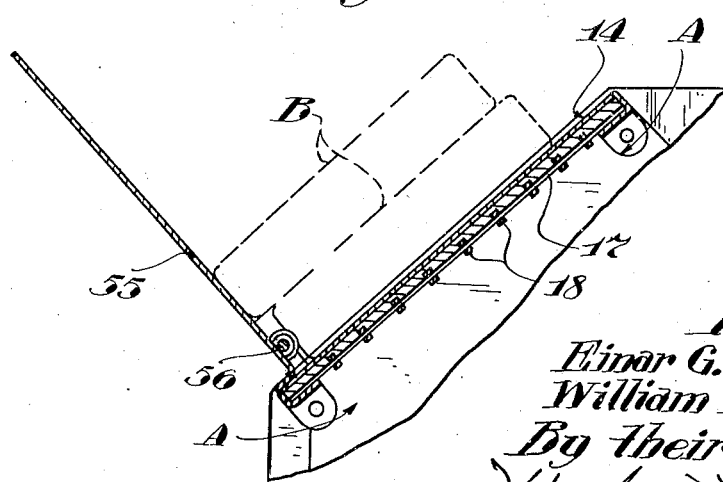
Fig. 8 is a section taken in a vertical plane approximately indicated by the line marked 8—8 on Fig. 7, and some parts being broken away.

The structure illustrated in Figs. 7 and 8 may be assumed to be the structure previously described, but with a toast-holding leaf 55 hinged at 56 to the lower portion of the inclined top plate 14 of the casing. When this leaf is extended as shown in Figs. 7 and 8, it will hold a plurality of toasted slices B, as indicated by dotted lines in Fig. 8, and in positions where they will be subject to more or less radiated heat. When leaf 55 is not to be used, it may be turned against the top plate 14 where it will be entirely out of the way.

In the structure illustrated in Figs. 9 and 10, an enclosed warming oven or toast container is formed on the top of the inclined plate 14. This oven, as shown, is formed by extensions 12ᵃ of the side plates 12 by bottom and top plates 57 and 58 attached to the plate 14 and by a cover or lid 59 hinged to the plate extensions 12ᵃ at 60.

The toaster above described has, in practice, been found to be not only highly efficient for the purposes had in view, but to be of simple construction capable of being manufactured at comparatively low cost. In operation it affords means for continuous toasting of the bread slices one after the other by the insertion of one slice immediately upon or following up the discharge of a toasted slice. The device, therefore, lends itself to automatic feeding or supply, whereby the action will become practically continuous or without interruption. The toaster illustrated in the drawings is especially designed for the toasting of one slice at a time, but is capable of modification within the scope of the invention herein disclosed for the simultaneous toasting of several slices, but in all of such modifications will be found the important feature of the provision of electrical toasting elements arranged and spaced to afford an oblique toasting chamber or chambers, open at upper and lower ends for the feeding or passage of bread slices or toast obliquely downward therethrough.

What we claim is:

1. In an electric toaster, the combination with a casing, of electrical heating elements spaced and arranged in said casing to afford an inclined toasting chamber that is open at upper and lower ends for the passage of toast downward therethrough, and a shelf applied to said casing and located for enough below the discharge end of said inclined toasting chamber to permit the toast to be discharged onto the same under the action of gravity, and which shelf is mounted to slide into and out of said casing.

2. An electric toaster having electrical heating elements spaced and arranged to afford an inclined toasting chamber that is open at its upper and lower ends for the passage of toast therethrough, and a retractable detent for detaining the toast in said toasting chamber, and which detent includes a rock shaft with laterally spaced detent-acting dogs or arms, said rock shaft having a projecting arm and an anchored spring attached thereto and normally projecting said detent-acting dogs through the bottom of said inclined toasting chamber.

3. An electric toaster comprising a casing and upper and lower vertically spaced inclined electrical heating elements, said casing and heating elements being constructed and arranged to afford a toasting chamber serving as a runway for the toast and that is open at its top to receive the toast and is open at its bottom to discharge the toast, and releasable means for detaining the toast in said chamber during the toasting action, said casing having an inclined top plate overlying said upper electrical heating element and provided on said top plate with means for holding toast thereon to maintain the same in a warm condition.

In testimony whereof we affix our signatures.

EINAR G. C. LOFGREN.
WILLIAM M. ANDERSON.